(12) United States Patent
Akahori (10) Patent No.: US 8,005,157 B2
(45) Date of Patent: Aug. 23, 2011

(54) CORRELATION CALCULATION UNIT AND CORRELATION CALCULATION APPARATUS

(75) Inventor: Hiroji Akahori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 667 days.

(21) Appl. No.: 12/134,500

(22) Filed: Jun. 6, 2008

(65) Prior Publication Data

US 2009/0052562 A1    Feb. 26, 2009

(30) Foreign Application Priority Data

Aug. 24, 2007   (JP) ................................. 2007-218557

(51) Int. Cl.
*H04K 1/10*   (2006.01)
*H04L 27/28*   (2006.01)

(52) U.S. Cl. ........................................................ 375/260

(58) Field of Classification Search .................. 375/130, 375/136, 141, 150, 259, 260, 267, 272, 295, 375/316, 326, 340, 343, 362, 371; 370/203, 370/204, 208, 210, 335, 342, 343, 350, 441
See application file for complete search history.

(56) References Cited

U.S. PATENT DOCUMENTS

| | | | | |
|---|---|---|---|---|
| 5,960,028 A | * | 9/1999 | Okamoto et al. | 375/130 |
| 7,289,765 B2 | * | 10/2007 | Okada et al. | 455/45 |
| 2002/0017948 A1 | * | 2/2002 | Hyakudai et al. | 329/304 |
| 2003/0117943 A1 | * | 6/2003 | Sakata et al. | 370/210 |
| 2004/0160987 A1 | * | 8/2004 | Sudo et al. | 370/480 |
| 2005/0099936 A1 | * | 5/2005 | Fujii et al. | 370/203 |
| 2005/0147187 A1 | * | 7/2005 | Mori | 375/324 |
| 2005/0163094 A1 | * | 7/2005 | Okada et al. | 370/343 |
| 2005/0163238 A1 | * | 7/2005 | Fujii | 375/260 |
| 2007/0002932 A1 | * | 1/2007 | Shirai et al. | 375/141 |

FOREIGN PATENT DOCUMENTS

| | | | |
|---|---|---|---|
| EP | 1018828 A2 | * | 7/2000 |
| JP | 11-163824 | | 6/1999 |
| JP | 2000-059332 | | 2/2000 |
| JP | 2000-295194 | | 10/2000 |

* cited by examiner

*Primary Examiner* — Dac V Ha
*Assistant Examiner* — Syed Haider
(74) *Attorney, Agent, or Firm* — Volentine & Whitt, PLLC (57) ABSTRACT

A correlation calculation unit includes: four arithmetic units each including a first differential arithmetic section calculating a difference between an OFDM (orthogonal frequency division multiplexing) signal and a first delay signal, a second differential arithmetic section calculating a difference between a second delay signal and a third delay signal, and a multiplication section multiplying arithmetic results of the first and second differential arithmetic sections; four polarity conversion units converting arithmetic results of the multiplication sections of the corresponding arithmetic units into polarity signals indicating polarities of the arithmetic results, respectively; four integrating units integrating the polarity signals obtained by the corresponding polarity conversion units, respectively; and an addition unit adding up integrating results of the four integrating units, and outputting an addition result as a correlation signal indicating a correlation between the OFDM signal and the second delay signal.

11 Claims, 10 Drawing Sheets

CORRELATION CALCULATION UNIT AND CORRELATION CALCULATION APPARATUS

CROSS-REFERENCE TO RELATED APPLICATION

This application claims priority under 35 USC 119 from Japanese Patent Application No. 2007-218557 filed Aug. 24, 2007, the disclosure of which is incorporated by reference herein.

BACKGROUND OF THE INVENTION

1. Technical Field

The present invention relates to a correlation calculation unit calculating a correlation between an OFDM signal having effective symbol intervals and guard intervals obtained by copying a part of a signal in one effective symbol interval, and a delay signal delayed from the OFDM signal.

2. Related Art

In recent years, an OFDM (Orthogonal Frequency Division Multiplexing) modulation scheme has been used as a modulation scheme for digital terrestrial broadcasting or the like. In the OFDM scheme, a symbol is transmitted using a plurality of sub-carriers differing in central frequency. "Symbol" as used herein means a set of data transmitted per modulation.

Figure 9:
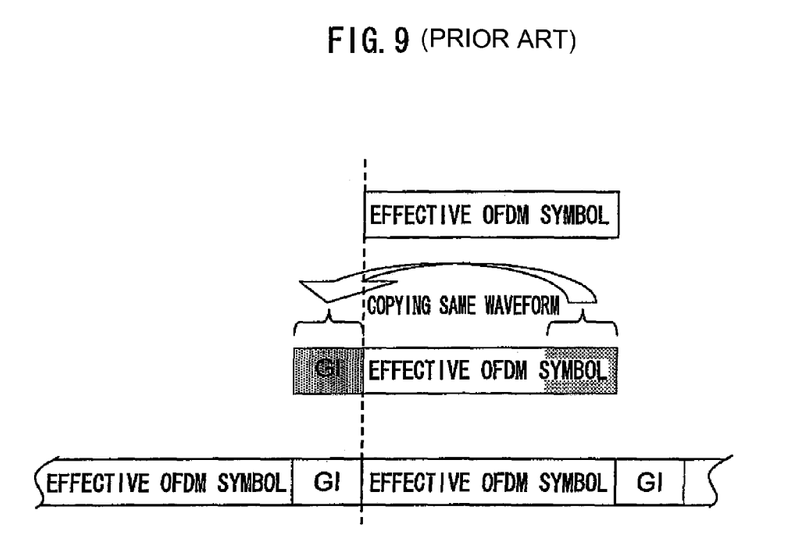
FIG. 9 is a schematic diagram for explaining a format of an OFDM signal.

One symbol interval includes an effective symbol interval and a guard interval. As shown in FIG. 9, in the OFDM scheme, the influence of multipath interference is suppressed by copying a part of a signal in the effective symbol interval to be actually demodulated and inserting the copied part, as a repeating waveform, between effective symbol signals in the effective symbol intervals. The interval of this copied waveform corresponds to a guard interval.

Figure 10:
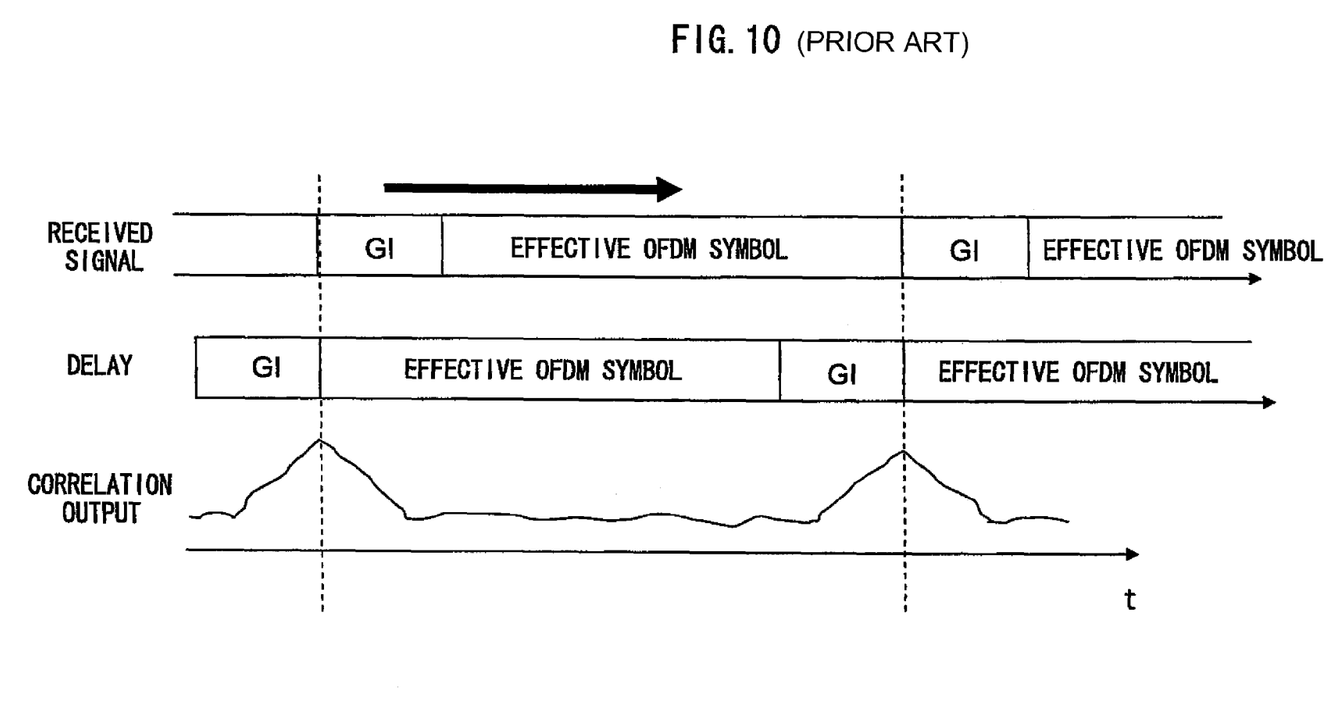
FIG. 10 is a schematic diagram for explaining a conventional method of calculating a correlation value between a received OFDM signal and a signal delayed from the OFDM signal by a length of an effective symbol interval.

To demodulate the OFDM signal, one received OFDM signal is converted into a digital signal by an A/D converter, the guard interval is eliminated and the effective symbol signal is extracted from the digital signal, and the effective symbol signal is demodulated by an FFT (Fast Fourier Transformer). Specifically, as shown in FIG. 10, a correlation value between the received OFDM signal and a signal delayed from the OFDM signal by the length of the effective symbol interval is calculated. A maximum value of an integrated correlation value is extracted, the guard interval is eliminated and the effective symbol interval is extracted from the OFDM signal based on the timing of the maximum value, and the extracted effective symbol interval is demodulated by FFT. This conventional technique is disclosed in, for example, Japanese Patent Application Laid-Open (JP-A) Nos. 11-163824 and 2000-059332.

The conventional OFDM has, however, the following problems. If received (reception) power is low, the influence of fading or multipath is great, or a narrowband noise signal enters a reception band, then the correlation value may become small and offset or lose the timing of the maximum value, resulting in deterioration in reception performance.

A technique for calculating a correlation value by multiplying each of a real image component and a virtual image component of a received signal by polarity information to make a complex calculation is also known as disclosed in, for example, JP-A No. 2000-295194. This correlation calculation technique has, however, the following problems. The correlation value is calculated using a polarity-inverted signal directly. Due to this, a noise component is added to the correlation value directly and the influence of noise cannot be suppressed. Further, circuit size cannot be reduced.

SUMMARY OF THE INVENTION

It is an object of the present invention to provide a correlation calculation unit and a correlation calculation apparatus that may suppress influence of a noise signal, calculate a correlation between an OFDM signal and a delay signal delayed from the OFDM signal by a length of an effective symbol interval, and make a circuit small in scale.

According to an aspect of the invention, there is provided a correlation calculation unit comprising: four arithmetic units each including a first differential arithmetic section calculating a difference between an OFDM signal and a first delay signal delayed from the OFDM signal by a preset time and having a phase changed from the OFDM signal by a preset phase variation, the OFDM signal representing an orthogonal frequency division multiplexing signal, and one symbol interval of the OFDM signal including an effective symbol interval and a guard interval obtained by copying a part of a signal in the effective symbol interval; a second differential arithmetic section calculating a difference between a second delay signal delayed from the OFDM signal by a length of the effective symbol interval and a third delay signal further delayed from the second delay signal by the preset time and having a phase changed from the second delay signal by the preset phase variation; and a multiplication section multiplying an arithmetic result of the first differential arithmetic section by an arithmetic result of the second differential arithmetic section, wherein the four arithmetic units respectively differ in the phase variation by $\pi/2$; four polarity conversion units provided to correspond to the four arithmetic units, and converting arithmetic results of the multiplication sections of the corresponding arithmetic units into polarity signals indicating polarities of the arithmetic results, respectively; four integrating units provided to correspond to the four polarity conversion units, and integrating the polarity signals obtained by the corresponding polarity conversion units, respectively; and an addition unit adding up integrated results of the four integrating units, and outputting an addition result as a correlation signal indicating a correlation between the OFDM signal and the second delay signal.

If delay time is the same, the phase variation is proportional to the frequency. Therefore, four different passing frequency characteristics are obtained by causing the four arithmetic units to calculate the differences between the OFDM signal or delay signal and the signal given the preset amount of the phase rotation.

Namely, with the above-stated configuration, four complex numbers having different passing frequency characteristics are calculated, polarity-converted complex numbers are integrated, and the resultant integrated polarity-converted complex numbers are added up, thereby generating the correlation signal. The correlation less influenced by the narrowband noise signal may be thereby obtained. The obtained complex numbers are subjected to polarity conversion after calculating the complex numbers, whereby the influence of the noise may be suppressed. Thus, a highly reliable correlation result may be obtained. Besides, the number of arithmetic bits may be decreased by the polarity conversion, and the integrating circuits and the addition circuit may be made smaller in scale than those according to the conventional technique, whereby reduction in the circuit scale may be realized.

Further, the present correlation calculation apparatus may include: a plurality of correlation calculation units according to the first aspect of the invention; a control unit controlling post-delay OFDM signals delayed from the OFDM signal by time lengths different among the plurality of correlation calculation units to be input to the plurality of correlation calculation units, respectively as the OFDM signal of each of the plurality of correlation calculation units; and a total addition unit adding up correlation signals calculated and output from the plurality of correlation calculation units, respectively, and outputting an addition result as a correlation signal indicating a correlation between the OFDM signal and a signal delayed from the OFDM signal by the effective symbol interval.

With the above-stated configuration, similarly to the correlation calculation unit, the correlation calculation apparatus may calculate the correlation signal while suppressing the influence of the noise signal and realize reduction in circuit scale. Further, by providing a plurality of correlation calculation units, the correlation calculation apparatus may cause the correlation calculation units to generate correlation signals offset in time position from one another, add up the correlation signals, and output the addition result as one correlation signal. Therefore, even if multipath occurs, the correlation calculation apparatus may suppress a fluctuation in the maximum value of the correlation signal.

The control unit of the correlation calculation apparatus according to the invention may further control signals delayed from the delayed OFDM signals for the plurality of correlation calculation units respectively by the effective symbol interval to be input to the plurality of correlation calculation units, respectively as the second delay signal of each of the plurality of correlation calculation units.

With the configuration stated above, a unit for delay may be shared and the correlation calculation apparatus may be downsized.

Moreover, the control unit may include a plurality of delay circuits.

Furthermore, the control unit may include a storage unit storing the OFDM signal; a selective input control unit reading the OFDM signal stored in the storage unit, and selectively inputting the OFDM signal to the plurality of correlation calculation units; and an adjustment unit adjusting delay time of the OFDM signal by changing a read region of the storage unit from which region the OFDM signal is read.

Further, the correlation calculation apparatus according to the invention may further include a weighting unit multiplying a plurality of correlation signals output from the plurality of correlation calculation units by weighting factors preset for the plurality of correlation calculation units, respectively, and the total addition unit may add up the correlation signals multiplied by the weighting factors, respectively, and output the addition result as the correlation signal indicating the correlation between the OFDM signal and the signal delayed from the OFDM signal by the effective symbol interval.

By thus multiplying the correlation signals output from the correlation arithmetic units by weighting factors, respectively and then adding up the correlation signals multiplied by the weighting factors, the correlation calculation apparatus may suppress the influence of a delay wave and generate the correlation signal smaller in fluctuation.

As described above, the invention may advantageously calculate the correlation between the OFDM signal and the delay signal delayed from the OFDM signal by the effective symbol interval while suppressing the influence of the noise signal, and may reduce the circuit scale.

DETAILED DESCRIPTION OF THE INVENTION

Exemplary embodiments of the present invention will be described hereinafter in detail with reference to the accompanying drawings.

First Exemplary Embodiment

Figure 1:
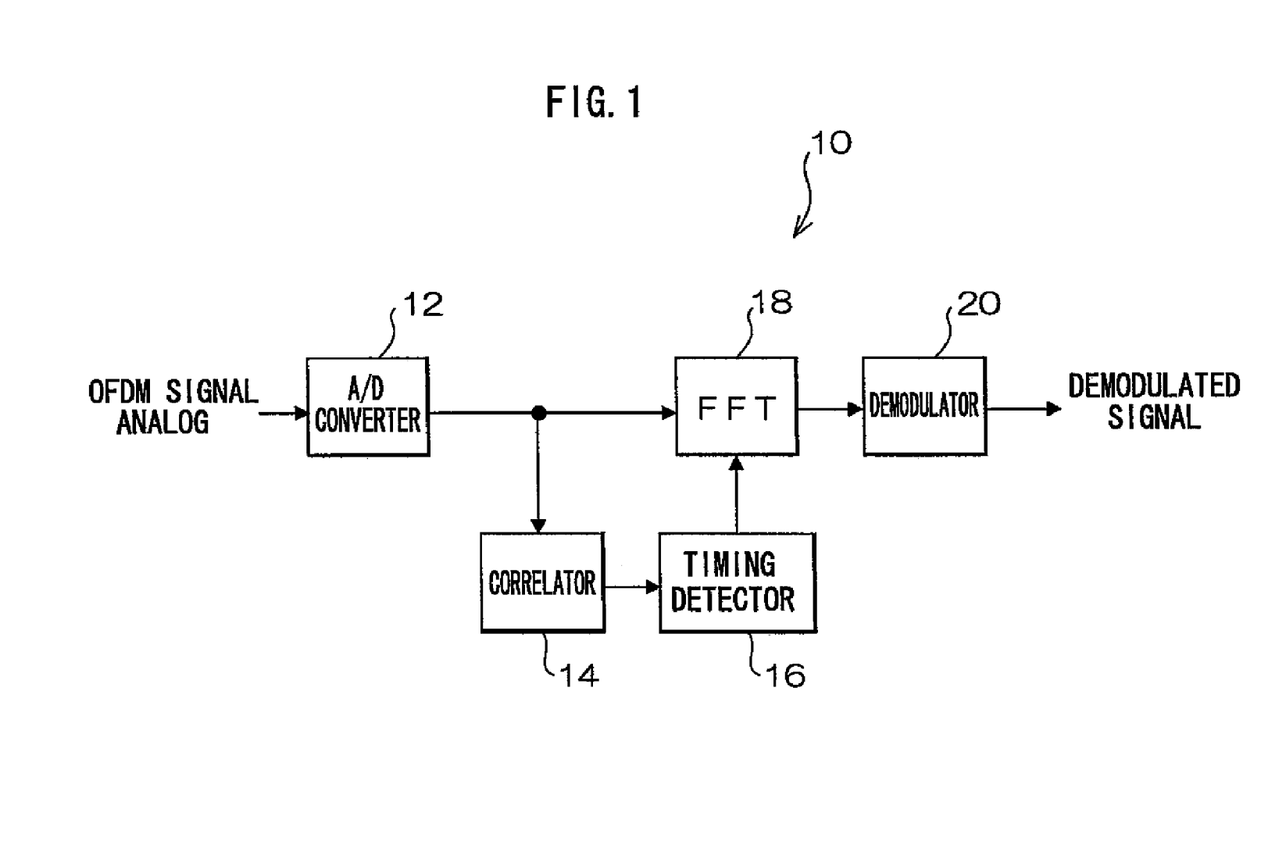
FIG. 1 is a schematic block diagram showing a configuration of an OFDM signal demodulation apparatus according to each of first to third exemplary embodiments of the invention.

FIG. 1 is a schematic block diagram showing a configuration of an OFDM (Orthogonal Frequency Division Multiplexing) signal demodulation apparatus 10 according to a first exemplary embodiment of the invention. The OFDM signal demodulation apparatus 10 is an apparatus receiving and demodulating an OFDM signal. As shown in FIG. 9, one symbol interval of the OFDM signal includes an effective symbol interval and a guard interval obtained by copying a part of a signal in the available symbol interval. The guard interval is excluded and the signal in the available symbol interval is extracted from the OFDM signal, and the signal in the available symbol interval (effective symbol signal) is subjected to fast Fourier transform to be demodulated.

As shown in FIG. 1, the OFDM signal demodulation apparatus 10 includes an A/D converter 12, a correlator 14, a timing detector 16, an FFT (Fast Fourier Transformer) unit 18, and a demodulator 20.

The A/D converter 12 samples a received analog OFDM signal in a predetermined cycle synchronously with a sampling clock signal to convert the analog OFDM signal into a digital signal, and outputs the digital signal to the correlator 14 and to the FFT unit 18.

The correlator 14 calculates a correlation between the digital OFDM signal and a delay signal delayed from the OFDM signal by a length of one effective symbol interval, and outputs a correlation signal indicating the calculated correlation to the timing detector 16.

The timing detector 16 outputs a timing signal for extracting the effective symbol signal from the OFDM signal based on the correlation signal received from the correlator 14. Specifically, the timing detector 16 detects a timing at which the correlation signal marks a peak and outputs the timing signal based on this detected timing.

The FFT unit 18 extracts the effective symbol signal from the OFDM signal converted into the digital signal by the A/D converter 12 based on the timing signal output from the timing detector 16, and subjects the effective symbol signal to FFT.

The demodulator 20 performs a demodulation processing on the Fourier-transformed signal, thereby obtaining a demodulated signal.

Figure 2:
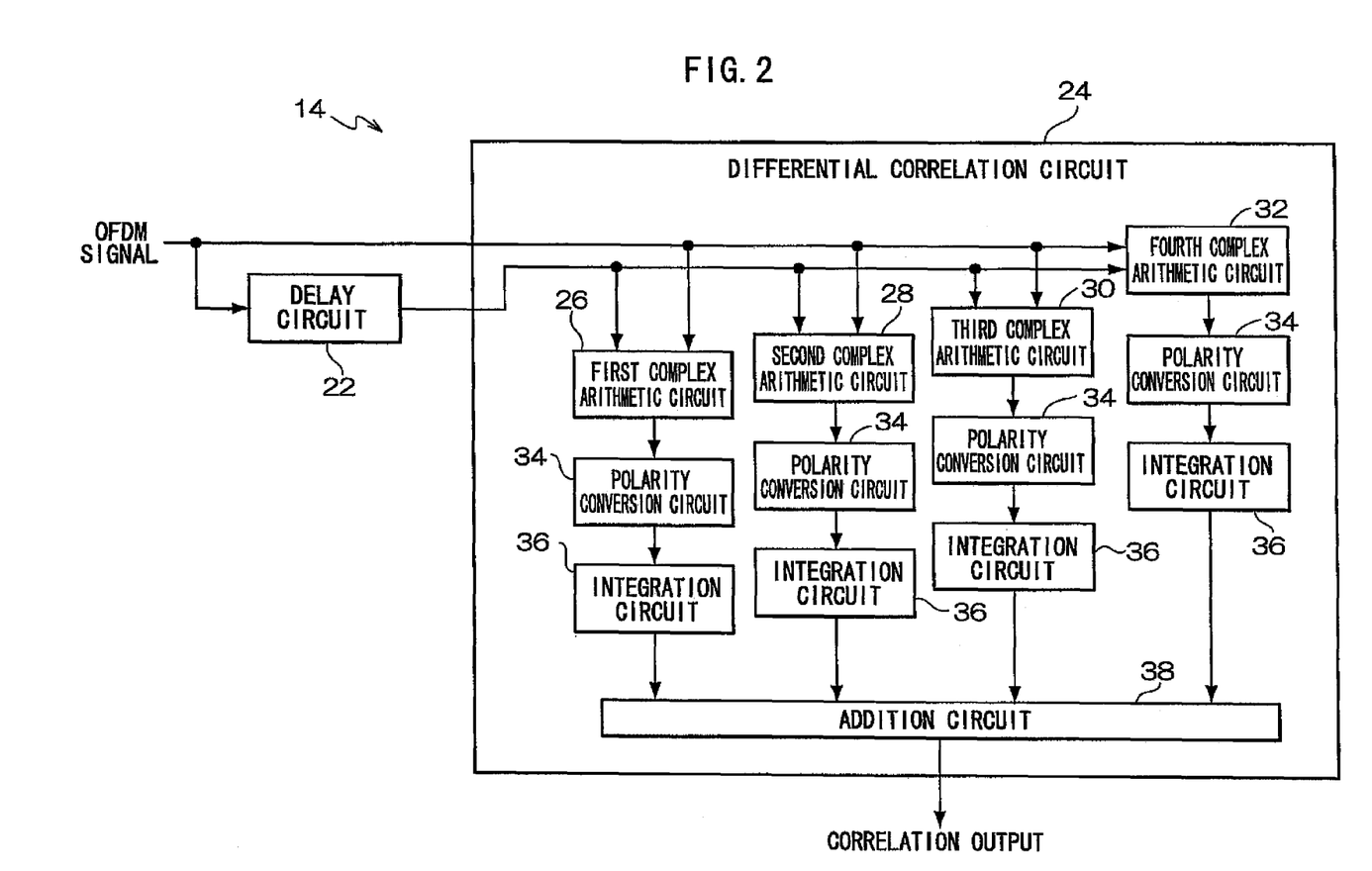
FIG. 2 is a block diagram showing a configuration of a correlator according to the first exemplary embodiment.

FIG. 2 is a block diagram showing a configuration of the correlator 14. The correlator 14 includes a delay circuit 22 and a differential correlation circuit 24.

The delay circuit 22 delays the input OFDM signal by one effective symbol interval.

The pre-delay OFDM signal and the OFDM signal delayed by the delay circuit 22 by one effective symbol interval are input to the differential correlation circuit 24. The differential correlation circuit 24 calculates a correlation between the pre-delay OFDM signal and the delayed OFDM signal and outputs the correlation signal indicating the correlation. In the exemplary embodiments, the original or pre-delay OFDM signal and the post-delay OFDM signal will be discriminated from each other while the original or pre-delay OFDM signal will be simply referred to as "OFDM signal" and the post-delay OFDM signal delayed from the original OFDM signal by the length of one effective symbol interval will be referred to as "delay signal" (corresponding to a "second delay signal" according to the invention).

The differential correlation circuit 24 includes a first complex arithmetic circuit 26, a second complex arithmetic circuit 28, a third complex arithmetic circuit 30, and a fourth complex arithmetic circuit 32.

Each of the first, second, third, and fourth complex arithmetic circuits 26, 28, 30, and 32 makes a complex calculation by dividing each of the input OFDM signal and the delay signal into complex components. Since the first, second, third, and fourth complex arithmetic circuits 26, 28, 30, and 32 are similar in configuration, the configuration of the first complex arithmetic circuit 26 will be typically described.

Figure 3:
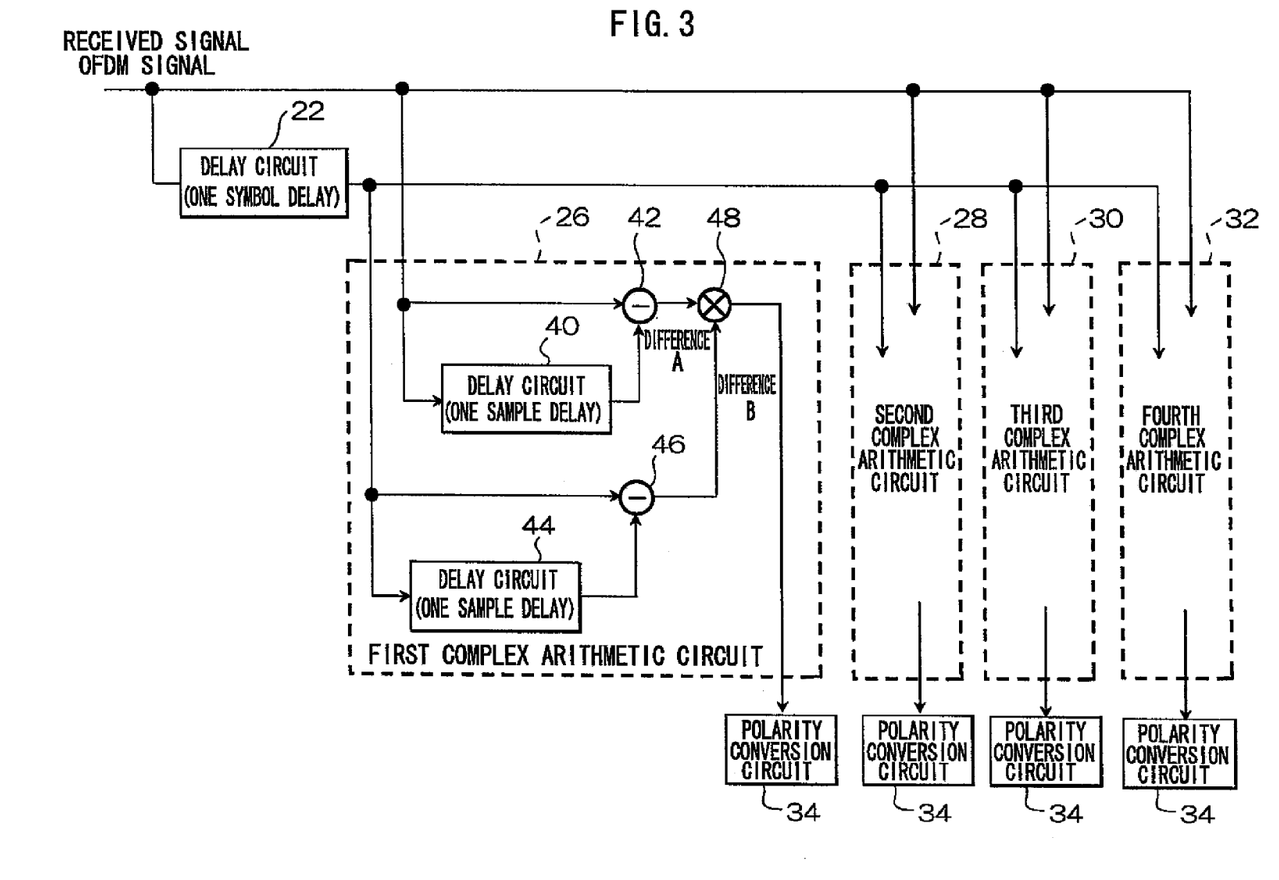
FIG. 3 is a schematic diagram showing a configuration of a first complex arithmetic circuit.

FIG. 3 shows the configuration of the first complex arithmetic circuit 26. The first complex arithmetic circuit 26 includes a delay circuit 40, a first differential circuit 42, a delay circuit 44, a second differential circuit 46, and a multiplication circuit 48.

The OFDM signal is input to the delay circuit 40. The delay circuit 40 delays the OFDM signal by one sample time (corresponding to one cycle of the sampling clock), also changes a phase of the OFDM signal by a preset phase variation (applies a phase rotation to the OFDM signal), and outputs the resultant OFDM signal to the first differential circuit 42. The phase variation differs among the first, second, third, and fourth complex arithmetic circuits 26, 28, 30, and 32. In the first exemplary embodiment, the delay circuits 40 of the first, second, third, and fourth complex arithmetic circuits 26, 28, 30, and 32 are set so that the phase variation of the first complex arithmetic circuit 26 is 0 (no phase variation), that of the second complex arithmetic circuit 28 is $-\pi/2$ (multiplied by $-j$), that of the third complex arithmetic circuit 30 is $\pi$ (multiplied by $-1$), and that of the fourth complex arithmetic circuit 32 is $\pi/2$ (multiplied by $j$).

The first differential circuit 42 makes a complex calculation of a difference between the OFDM signal (without delay) and the signal (corresponding to a "first delay signal" according to the invention) delayed from the OFDM signal by a length of one sample time and given the phase rotation by the delay circuit 40. The difference obtained by the first differential circuit 42 will be referred to as "difference A", hereinafter.

Meanwhile, a delayed OFDM signal (delay signal) delayed from the OFDM signal by one effective symbol interval is input to the delay circuit 44. The delay circuit 44 further delays the delay signal by one sample time, changes a phase of the delay signal by the same phase variation as that of the delay circuit 40 (applies the same phase rotation to the delay signal), and outputs the resultant delay signal to the second differential circuit 46.

The second differential circuit 46 makes a complex calculation of a difference between the delay signal and a signal (corresponding to a "third delay signal" according to the invention) further delayed by one sample time and given the phase rotation by the delay circuit 44. The difference obtained by the second differential circuit 46 will be referred to as "difference B", hereinafter.

The multiplication circuit 48 multiplies the arithmetic result (difference A) of the first differential circuit 42 by the arithmetic result (difference B) of the second differential circuit 46, and outputs a multiplication result to a polarity conversion circuit 35 arranged in rear of the first complex arithmetic circuit 26.

Namely, the first, second, third, and fourth complex arithmetic circuits 26, 28, 30, and 32 provide the following arithmetic outputs of complex numbers, respectively.

Complex number corr1(t) output from the first complex arithmetic circuit 26:

$$corr1(t) = [\text{Re}(\text{rx\_in}(t)) - \text{Re}(\text{rx\_in}(t-1))] * \quad (1)$$
$$[\text{Re}(\text{rx\_in}(t-gi)) - \text{Re}(\text{rx\_in}(t-gi-1))] - [\text{Im}(\text{rx\_in}(t)) -$$
$$\text{Im}(\text{rx\_in}(t-1))] * [\text{Im}(\text{rx\_in}(t-gi)) - \text{Im}(\text{rx\_in}(t-gi-1))] +$$
$$j\{[\text{Im}(\text{rx\_in}(t)) - \text{Im}(\text{rx\_in}(t-1))] *$$
$$[\text{Re}(\text{rx\_in}(t-gi)) - \text{Re}(\text{rx\_in}(t-gi-1))] +$$
$$[\text{Re}(\text{rx\_in}(t)) + \text{Re}(\text{rx\_in}(t-1))] *$$
$$[Im(\text{rx\_in}(t-gi)) + \text{Im}(\text{rx\_in}(t-gi-1))]\}$$

Complex number corr2(t) output from the second complex arithmetic circuit 28:

$$corr2(t) = [\text{Re}(\text{rx\_in}(t)) - \text{Im}(\text{rx\_in}(t-1))] * \quad (2)$$
$$[\text{Re}(\text{rx\_in}(t-gi)) - \text{Im}(\text{rx\_in}(t-gi-1))] - [\text{Im}(\text{rx\_in}(t)) +$$
$$\text{Re}(\text{rx\_in}(t-1))] * [\text{Im}(\text{rx\_in}(t-gi)) + \text{Re}(\text{rx\_in}(t-gi-1))] +$$
$$j\{[\text{Im}(\text{rx\_in}(t)) + \text{Re}(\text{rx\_in}(t-1))] *$$
$$[\text{Re}(\text{rx\_in}(t-gi)) - \text{Im}(\text{rx\_in}(t-gi-1))] +$$
$$[\text{Re}(\text{rx\_in}(t)) - \text{Im}(\text{rx\_in}(t-1))] *$$
$$[\text{Im}(\text{rx\_in}(t-gi)) + \text{Re}(\text{rx\_in}(t-gi-1))]\}$$

Complex number corr3(t) output from the first complex arithmetic circuit 30:

$$corr3(t) = [\text{Re}(\text{rx\_in}(t)) + \text{Re}(\text{rx\_in}(t-1))] * \quad (3)$$
$$[\text{Re}(\text{rx\_in}(t-gi)) + \text{Re}(\text{rx\_in}(t-gi-1))] - [\text{Im}(\text{rx\_in}(t)) +$$
$$\text{Im}(\text{rx\_in}(t-1))] * [\text{Im}(\text{rx\_in}(t-gi)) + \text{Im}(\text{rx\_in}(t-gi-1))] +$$
$$j\{[\text{Im}(\text{rx\_in}(t)) + \text{Im}(\text{rx\_in}(t-1))] *$$

-continued $$[\text{Re}(rx\_in(t-gi)) + \text{Re}(rx\_in(t-gi-1))] +$$
$$[\text{Re}(rx\_in(t)) + \text{Re}(rx\_in(t-1))] *$$
$$[\text{Im}(rx\_in(t-gi)) + \text{Im}(rx\_in(t-gi-1))]\}$$

Complex number corr4(t) output from the second complex arithmetic circuit 32:

$$corr4(t) = [\text{Re}(rx\_in(t)) + \text{Im}(rx\_in(t-1))] * \quad (4)$$
$$[\text{Re}(rx\_in(t-gi)) + \text{Im}(rx\_in(t-gi-1))] - [\text{Im}(rx\_in(t)) -$$
$$\text{Re}(rx\_in(t-1))] * [\text{Im}(rx\_in(t-gi)) - \text{Re}(rx\_in(t-gi-1))] +$$
$$j\{[\text{Im}(rx\_in(t)) - \text{Re}(rx\_in(t-1))] *$$
$$[\text{Re}(rx\_in(t-gi)) + \text{Im}(rx\_in(t-gi-1))] +$$
$$[\text{Re}(rx\_in(t)) + \text{Im}(rx\_in(t-1))] *$$
$$[\text{Im}(rx\_in(t-gi)) - \text{Re}(rx\_in(t-gi-1))]\}$$

In the Equations (1) to (4):

t: discrete time of the OFDM signal;

gi: discrete time corresponding to the effective symbol interval; and rx_in(t): the OFDM signal. Further, symbol Re denotes a real part of each complex number and symbol Im denotes an imaginary part of the complex number.

Moreover, the "discrete time" indicates time based on the sampling clock signal. Accordingly, rx_in(t−1), for example, indicates an OFDM signal one sample time before the OFDM signal (that is, delayed from the OFDM signal by one sample time).

In this way, each of the first, second, third, and fourth complex arithmetic circuits 26, 28, 30, and 32 outputs the result of multiplying the difference A between the OFDM signal and the signal one sample time before the OFDM signal by the difference B between the delay signal delayed from the OFDM signal by one effective symbol interval and the signal one sample time before the delay signal.

Figure 4:
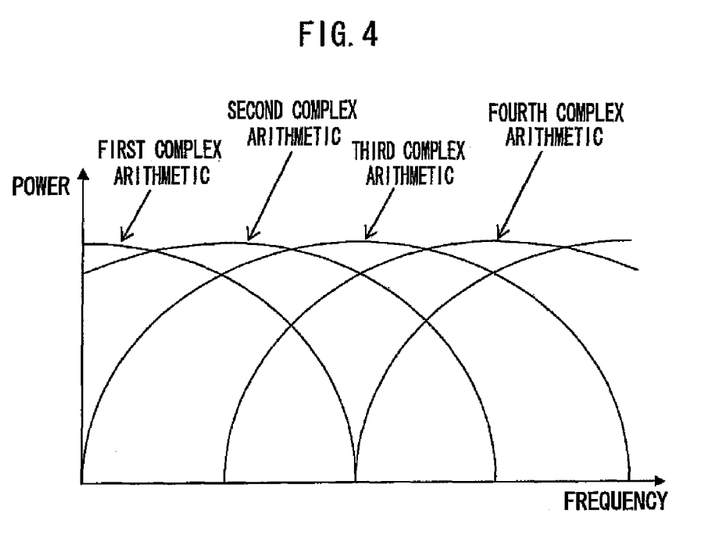
FIG. 4 is a chart showing passing frequency characteristics of first to fourth complex arithmetic circuits.

Furthermore, as stated above, the phase rotation of an amount preset for each complex arithmetic circuit is applied to the signal one sample time before the OFDM signal or delay signal. As well known, as long as delay time is the same, the amount and the frequency of the phase rotation are proportional to each other. Consequently, as shown in FIG. 4, four different passing frequency characteristics are obtained by causing the four complex arithmetic circuits 26, 28, 30, and 32 to calculate the differences between the OFDM signal and the signal one sample time before the OFDM signal or delay signal and given the preset amount of the phase rotation.

The polarity conversion circuits 34 are connected to the first, second, third, and fourth complex arithmetic circuits 26, 28, 30, and 32, respectively. The four polarity conversion circuits 34, which are identical in configuration, convert the complex numbers output from the first, second, third, and fourth complex arithmetic circuits 26, 28, 30, and 32 into binary polarity information, respectively.

The polarity conversion circuit 34 connected to the first complex arithmetic circuit 26 makes the following arithmetic operation.

$$\text{Re}(pole\_corr1(t)) = \begin{cases} -1: & \text{Re}(corr1(t)) > 0 \\ 1: & \text{Re}(corr1(t)) \le 0 \end{cases} \quad (5)$$

$$\text{Im}(pole\_corr1(t)) = \begin{cases} -1: & \text{Im}(corr1(t)) > 0 \\ 1: & \text{Im}(corr1(t)) \le 0 \end{cases} \quad (6)$$

t: discrete time of the OFDM signal;

corr1(t): output from the first complex arithmetic circuit 26; and pole_corr1(t): output (polarity information) from the polarity conversion circuit 34.

In this manner, the real part (Re) and the imaginary part (Im) of the complex number output from the first complex arithmetic circuit 26 are subjected to polarity conversion, respectively.

The polarity conversion circuits 34 connected to the second, third, and fourth complex arithmetic circuits 28, 30, and 32, respectively perform the same processing as that performed by the polarity converter 34 connected to the first complex arithmetic circuit 26.

Integrating circuits 36 are connected to the four polarity conversion circuits 34, respectively. The four integrating circuits 36, which are identical in configuration, integrate the polarity information obtained by the polarity conversion circuits 34 and output the resultant integrated polarity information, respectively.

An addition circuit 38 adds up the integration results output from the four integrating circuits 36 and outputs an addition result to the timing detector 16 in rear of the correlator 14 as the correlation signal indicating the correlation between the OFDM signal and the delay signal.

The timing detector 16 generates the timing signal based on the correlation signal as already stated above.

During transmission of the OFDM signal or reception of the OFDM signal, a sinusoidal wave or a narrowband noise signal may be often superimposed on a specific sub-carrier. If power of this narrowband signal is high, the output from the conventional correlator disadvantageously becomes small. According to the first exemplary embodiment of the invention, by contrast, a plurality of complex numbers having different passing frequency characteristics is calculated, polarity-converted complex numbers are integrated, and the resultant integrated polarity-converted complex numbers are added up, thereby generating the correlation signal. The correlation less influenced by the narrowband noise signal may be obtained.

According to the conventional technique, the correlator calculates the correlation by adding up the complex numbers without converting the complex numbers into binary information. Due to this, the noise component remains superimposed on the correlation signal, resulting in deterioration in the reliability of the correlation signal. According to the first exemplary embodiment, by contrast, the obtained complex numbers are subjected to polarity conversion (binary conversion), whereby the influence of the noise may be suppressed. Thus, a highly reliable correlation result is obtained.

Moreover, according to the first exemplary embodiment, the number of arithmetic bits may be decreased by the polarity conversion, and the integrating circuits and the addition circuit may be made smaller in scale than those according to the conventional technique, whereby reduction in the circuit scale may be realized.

Second Exemplary Embodiment

In a second exemplary embodiment of the invention, an instance of providing a plurality of differential correlation circuits 24 and of calculating a correlation signal by a plurality of differential correlation circuits 24 will be described.

Figure 5:
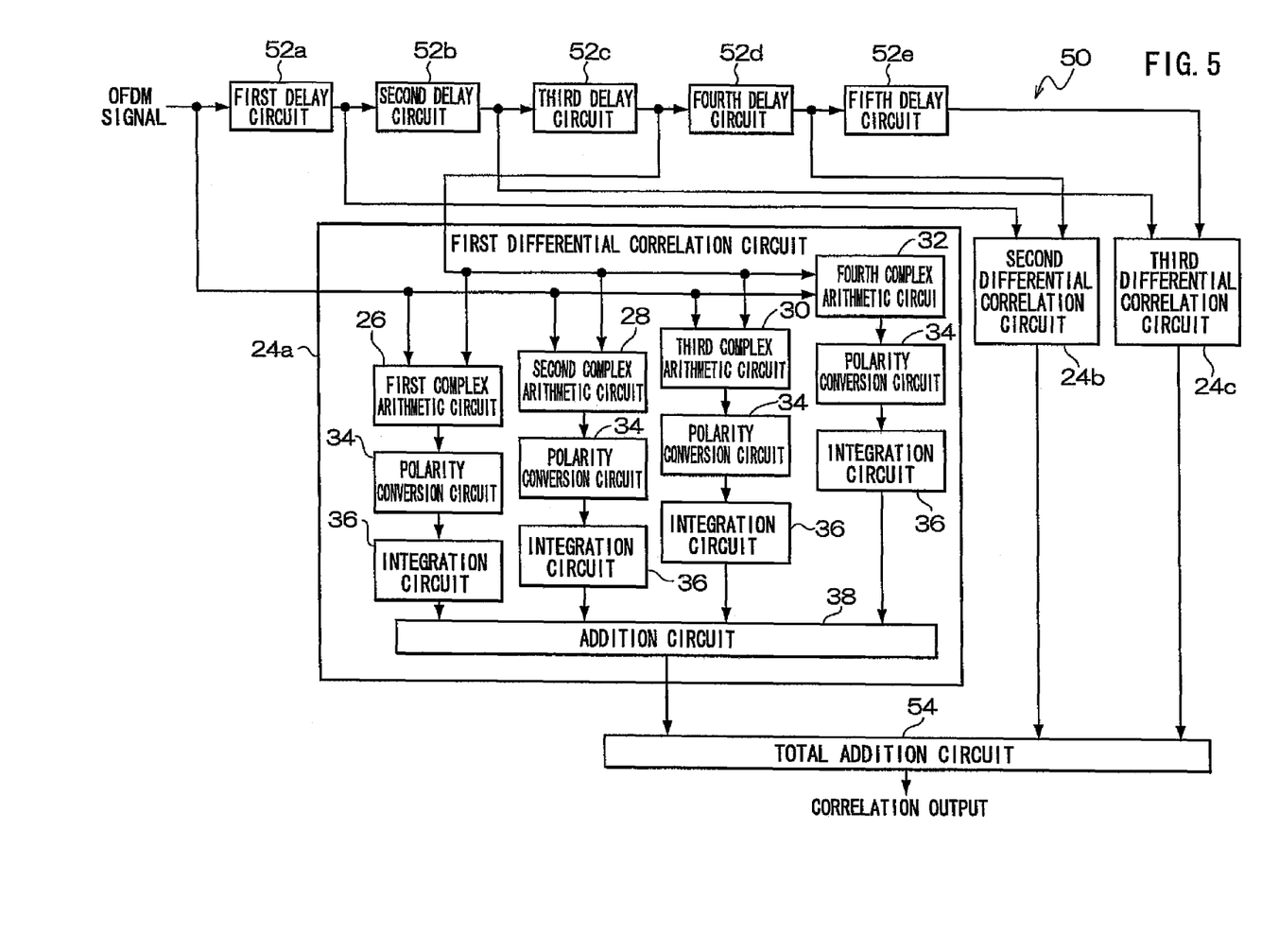
FIG. 5 is a block diagram showing a configuration of a correlator according to the second exemplary embodiment.

FIG. 5 is a block diagram showing a configuration a correlator 50 according to the second exemplary embodiment of the invention. Since an OFDM signal demodulation apparatus 10 according to the second exemplary embodiment is similar to that according to the first exemplary embodiment except that the correlator 14 is replaced by the correlator 50, it will not be described herein.

The correlator 50 according to the second exemplary embodiment includes five delay circuits (a first delay circuit 52a, a second delay circuit 52b, a third delay circuit 52c, a fourth delay circuit 52d, and a fifth delay circuit 52e), three differential correlation circuits (a first differential correlation circuit 24a, a second differential correlation circuit 24b, and a third differential correlation circuit 24c), and a total addition circuit 54. The five delay circuits 52a to 52e are identical in configuration. Therefore, if the delay circuits 52a to 52e are described without distinction, the delay circuits will be denoted simply by 52 without last symbols. Likewise, the three differential correlation circuits 24a, 24b, and 24c are identical in configuration. Therefore, if the differential correlation circuits 24a, 24b, and 24c are described without distinction, the differential correlation circuits will be denoted by 24 without last symbols. It is to be noted that each differential correlation circuit 24 according to the second exemplary embodiment is identical in configuration and operates similarly to the differential correlation circuit 24 according to the first exemplary embodiment. Therefore, the differential correlation circuit 24 will not be described herein in detail.

The five delay circuits 52 are identical in configuration and connected in series. Furthermore, the five delay circuits 52 are identical in delay time. However, the five delay circuits 52 are designed in advance so that a total of the delay time of three out of the five delay circuits 52 is equal to one effective symbol interval. Namely, the delay time of each delay circuit 52 is a one-third of one effective symbol interval.

Each delay circuit 52 is connected to one of the differential correlation circuits 24 so that an output from the delay circuit 52 is input to one differential correlation circuit 24 and to the delay circuit 52 in rear of the delay circuit 52 (or input only to one differential correlation circuit 24 if no delay circuit is present in rear of the delay circuit 52 such as the fifth delay circuit 52e).

More specifically, a pre-delay OFDM signal output from the A/D converter 12 is input to the first differential correlation circuit 24a and the first delay circuit 52a. An output end of the first delay circuit 52a is connected to the second delay circuit 52b and the second differential correlation circuit 24b. An output end of the second delay circuit 52b is connected to the third delay circuit 52c and the third differential correlation circuit 24c. An output end of the third delay circuit 52c is connected to the fourth delay circuit 52d and the first differential correlation circuit 24a. An output end of the fourth delay circuit 52d is connected to the fifth delay circuit 52e and the second differential correlation circuit 24b. An output end of the fifth delay circuit 52e is connected to the third differential correlation circuit 24c.

Namely, the first differential correlation circuit 24a generates a correlation signal representing a correlation between the pre-delay OFDM signal and a delay signal delayed from the pre-delay OFDM signal by the first to third delay circuits 52a to 52c.

The second differential correlation circuit 24b generates a correlation signal representing a correlation between a delay signal delayed from the pre-delay OFDM signal by the first delay circuit 52a and a delay signal delayed from the pre-delay OFDM signal by the first to fourth delay circuits 52a to 52d.

The third differential correlation circuit 24c generates a correlation signal representing a correlation between a delay signal delayed from the pre-delay OFDM signal by the first and second delay circuit 52a and 52b and a delay signal delayed from the pre-delay OFDM signal by the first to fifth delay circuits 52a to 52e.

As already stated, the delay circuits 52 are identical in delay time and the total delay time of the three delay circuits 52 is equal to one effective symbol interval. Accordingly, each differential correlation circuit 24 generates the correlation signal indicating the correlation between the signals different in time by a length of one effective symbol interval.

Arithmetic results (correlation signals) of the first, second, and third differential correlation circuits 24a, 24b, and 24c are input to the total addition circuit 54. The total addition circuit 54 adds up the input arithmetic results (correlation signals), and outputs an addition result to the timing detector 16 in rear of the correlator 50 as a correlation signal indicating a correlation between the OFDM signal and the delay signal delayed from the OFDM signal by one effective symbol interval. Namely, according to the second exemplary embodiment, the final correlation signal is calculated by adding up the three correlation signals calculated with time positions offset from one another respectively by a length of a one-third of one effective symbol interval.

By so configuring the correlator 50, the correlator 50 according to the second exemplary embodiment exhibits the following features in addition to those of the correlator 14 according to the first exemplary embodiment.

The conventional correlator calculates the correlation between the OFDM signal and the delay signal delayed from the OFDM signal by one effective symbol interval (see FIG. 10). A time position at which the correlator outputs a maximum value in on symbol cycle is detected using this correlator, and a window position (a guard interval elimination position) at an input of the FFT unit 18 is decided based on the detected time position. However, the conventional correlator has the problems that if multipath occurs, then accuracy of the correlation signal is decreased and the detected time position is offset.

An instance in which multipath occurs and in which not only a directly arriving signal (main incoming path) but also a signal (long delay path) arriving later than the main incoming path due to reflection or the like arrive at a receiving side will be considered.

Figure 6A:
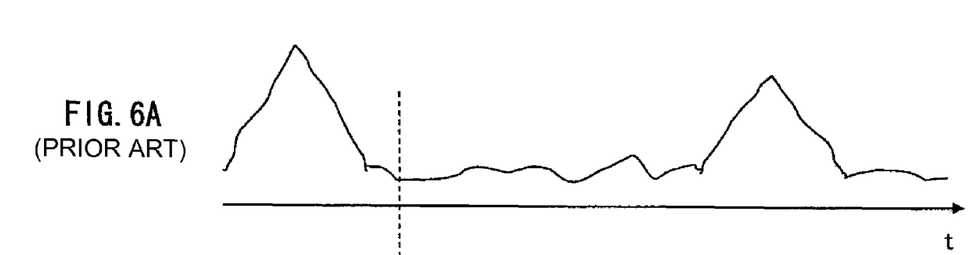
FIGS. 6A, 6B, and 6C are charts showing an example of correlation signals obtained by a conventional correlator during occurrence of multipath.
Figure 6B:
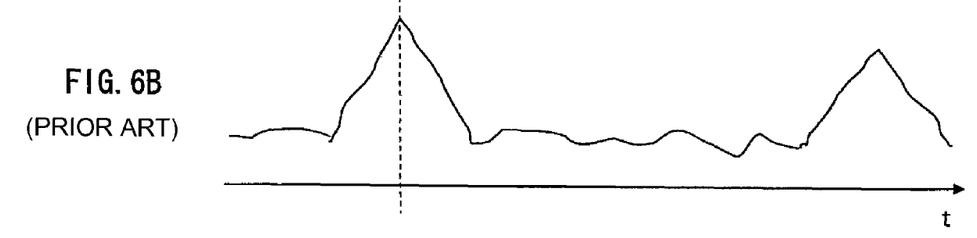
Figure 6C:
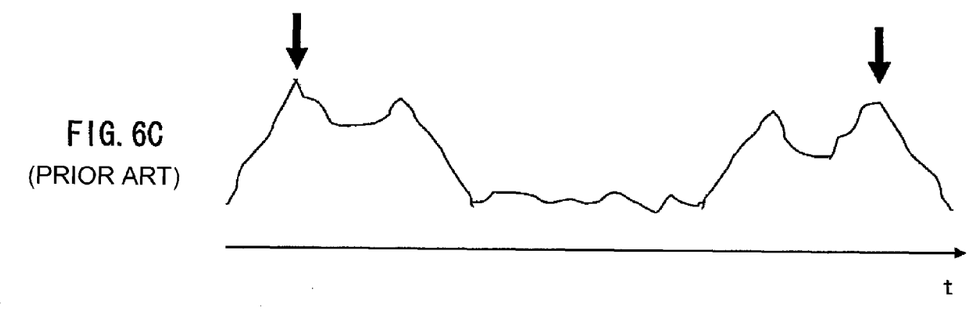

The conventional correlator outputs a correlation signal as shown in FIG. 6A during one-path reception in which the main incoming path alone is used. Further, during two-path reception in which the main incoming path and the long delay path, which are equal in power, are used as shown in FIGS. 6A and 6B, the conventional correlator outputs a correlation signal such as shown in FIG. 6C.

Namely, according to the conventional technique, if only one path (main incoming path) arrives at the receiving side, the correlation value reaches a maximum value at the time position of the main incoming path. Due to this, the timing may be favorably detected. However, if the two paths (the main incoming path and the long delay path) arrive at the receiving side, a strong correlation appears between the arrival time position of the main incoming path and that of the long delay path. Due to this, as shown in FIG. 6C, the conventional correlator outputs the correlation signal similar to a trapezoid having two vertexes having a time difference therebetween by as much as an interval corresponding to the delay time of the second path (hereinafter, "long delay time"). In actual communication, heights of these two vertexes are changed by the influence of either a waveform of the OFDM signal or an interference power component. Due to this, if time synchronization is to be realized using the conventional correlator, the position of the maximum correlation comes and goes to the two time positions separate from each other by the long delay time. As a result, stable time synchronization is not ensured, inter-symbol interference occurs, and reception characteristic deteriorates.

According to the second exemplary embodiment, by contrast the correlator 50 adds up the three correlation signals offset from one another in time position and outputs one correlation signal. Due to this, if a long delay path equal in reception power to the path serving as a main incoming wave is present, a strong correlation appears at an intermediate position between the main incoming path and the long delay path. Thus, it is possible to prevent a strong correlation from occurring between the arrival time position of the main incoming path and that of the long delay path as in prior art, thereby suppressing a fluctuation in time synchronization.

Figure 7A:
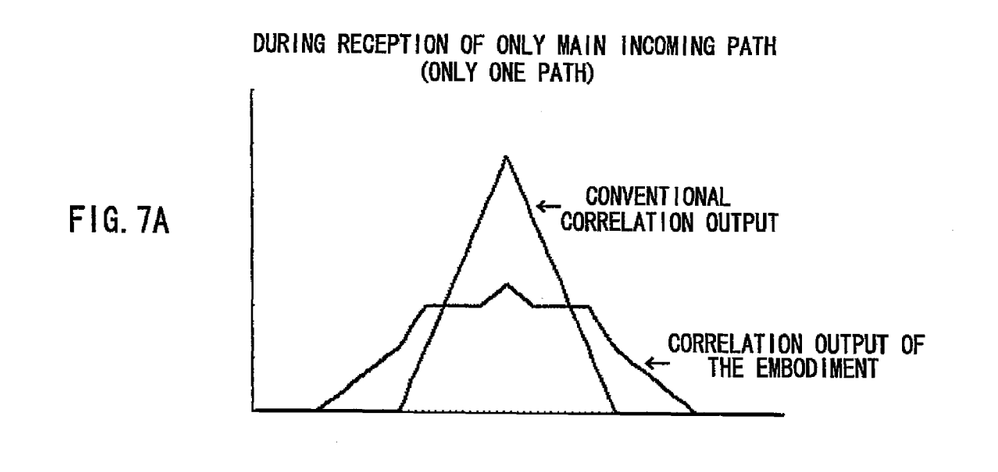
FIGS. 7A and 7B are charts showing comparisons between conventional correlation signals and correlation signals according to the present example during one-path reception in which a main incoming path alone is used and during two-path reception in which the main incoming path and a long delayed path equal in power are used.
Figure 7B:
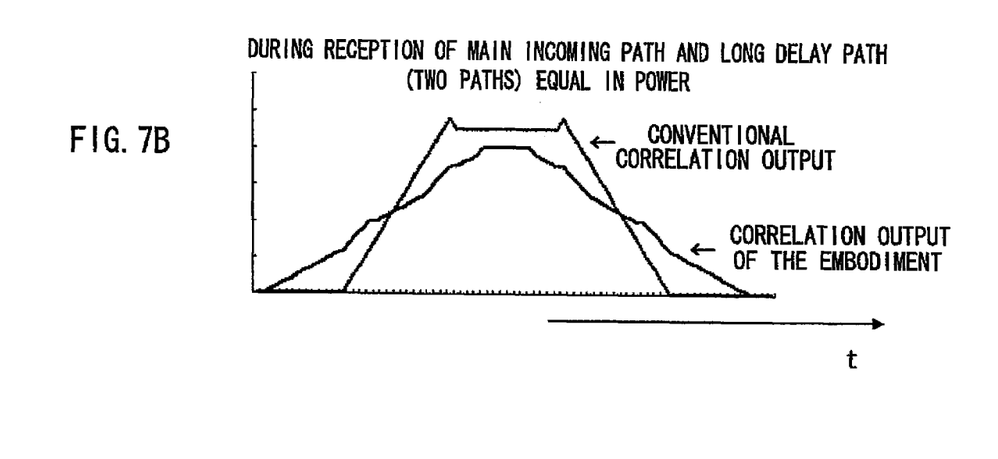

FIGS. 7A and 7B show comparisons between the conventional correlation signals and the correlation signals according to the present example during one-path reception in which the main incoming path alone is used (FIG. 7A) and during two-path reception in which the main incoming path and the long delay path, which are equal in power, are used (FIG. 7B).

Since the strongest correlation is obtained at the time position of the main incoming path as in prior art, the correlation output of the correlator 50 according to the present embodiment is capable of excellent timing detection. Further, during two-path reception, a correlation signal having a vertex (an upper bottom) a frusto-conical shape, which is shorter in time than the long delay time, is obtained at an intermediate position between the main incoming path and the long delay path.

In actual communication, a height of the vertex is changed by the influence of either the waveform of the OFDM signal or the interference power component as in prior art. However, since a time distance of the vertex is shorter than that of the correlation signal output from the conventional system, if time synchronization is to be realized using this correlator 50 according to the second exemplary embodiment, then an offset of the position of the maximum correlation is smaller than when using the conventional system, so that time synchronization is stabilized, and deterioration in reception characteristic due to the inter-symbol interference is reduced.

In the second exemplary embodiment, a case in which the three differential correlation circuits 24 are used has been described. However, the invention is by no means limited to a case in which the three differential correlation circuits 24 are used, and more than three differential correlation circuits 24 may be used.

Third Exemplary Embodiment

In a third exemplary embodiment of the invention, a case in which a plurality of differential correlation circuits 24 are provided and in which a correlation signal is generated by multiplying correlation signals output from the differential correlation circuits 24 by weighting factors respectively will be described.

Figure 8:
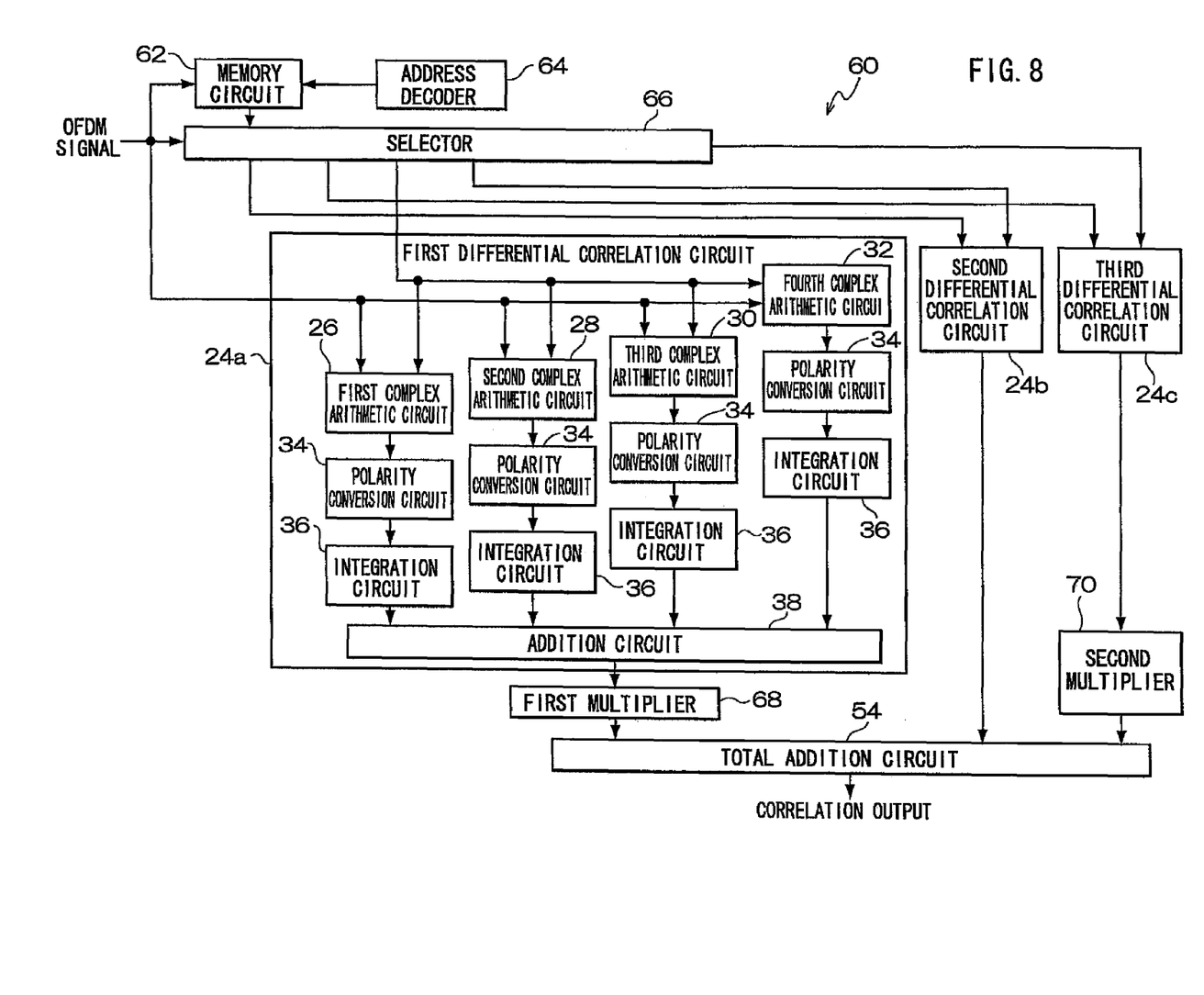
FIG. 8 is a block diagram showing a configuration of a correlator according to the third exemplary embodiment.

FIG. 8 shows a configuration of a correlator 60 according to the third exemplary embodiment of the invention. Since an OFDM signal demodulation apparatus 10 according to the third exemplary embodiment is similar to that according to the first exemplary embodiment except that the correlator 14 is replaced by the correlator 60, an explanation thereof is omitted.

The correlator 60 according to the third exemplary embodiment includes three differential correlation circuits (a first differential correlation circuit 24a, a second differential correlation circuit 24b, and a third differential correlation circuit 24c) and a total addition circuit 54, as in the second exemplary embodiment. The correlator 60 also includes a memory circuit 62, an address decoder 64, a selector 66, a first multiplier 68, and a second multiplier 70.

The memory circuits 62, the address decoder 64, and the selector 66 perform functions similar to those of the five delay circuits (the first delay circuit 52a, the second delay circuit 52b, the third delay circuit 52c, the fourth delay circuit 52d, and the fifth delay circuit 52e) according to the second exemplary embodiment.

The memory circuit 62 includes a storage region (not shown) and a read/write selector ("R/W selector") (not shown) for reading and writing data to or from the storage region. The storage region actually stores therein data, i.e., stores therein the OFDM signal output from the A/D converter 12. The R/W selector stores therein one OFDM signal output from the A/D converter 12 at a predetermined address sequentially. If receiving address information from the address decoder 64, the R/W selector reads a signal stored at an address indicated by the address signal and outputs the signal to the selector 66.

The address decoder 64 transmits the address information to the memory circuit 62. The address decoder 64 adjusts delay time of the OFDM signal by offsetting the address at which the OFDM signal is read from the memory circuit 62 according to preset delay time (a length of a one-third of one effective symbol interval in the third exemplary embodiment).

The selector 66 selectively outputs the OFDM signal read from the memory circuit 62 to the three differential correlation circuits 24.

With such configuration, an original or pre-delay OFDM signal and a delay signal delayed from the original or pre-delay OFDM signal by one effective symbol interval are input to the first differential correlation circuit 24a.

Further, A delay signal delayed from the original or pre-delay OFDM signal by a one-third of one effective symbol interval and a delay signal delayed from the former delay signal further by one effective symbol interval are input to the second differential correlation circuit 24b.

A delay signal delayed from the original or pre-delay OFDM signal by a two-thirds of one effective symbol interval and a delay signal delayed from the former delay signal further by one effective symbol interval are input to the third differential correlation circuit 24c.

As a result, similarly to the second exemplary embodiment, the three differential correlation circuits 24 generate correlation signals offset in time position from one another respectively by the one-third of one effective symbol interval, respectively.

In the third exemplary embodiment, the correlation signals generated by the three differential correlation circuits 24 are multiplied by weighting factors, thereby weighting three correlation signals output from the three differential correlation circuits 24, respectively.

The first multiplier 68 multiplies the correlation signal generated by the first differential correlation circuit 24a by a preset weighting factor. The second multiplier 70 multiplies the correlation signal generated by the third differential correlation circuit 24c by a preset weighting factor. Further, in the third exemplary embodiment, the correlation signal generated by the second differential correlation circuit 24b is not multiplied by a weighting factor (i.e., multiplied by a weighting factor of 1). That is, according to the third exemplary embodiment, the weighting factors are set based on the correlation signal output from the second differential correlation circuit 24b located temporally at the center Further, a time interval between the correlation signal output from the first differential correlation circuit 24a and that output from the second differential correlation circuit 24b is the same as that between the correlation signal output from the third differential correlation circuit 24c and that output from the second differential correlation circuit 24b. Thus, it is preferable that the weighting factors of the first and second multipliers 68 and 70 be the same.

The magnitude of the weighting factor is subjected to a demodulation process in t the OFDM signal demodulation apparatus 10 on a trial basis while being changed, and the best demodulated weighting factor is set at the first and second multipliers 68 and 70.

The total addition circuit 54 adds up an arithmetic result of the first multiplier 68, that of the second multiplier 70, and the correlation signal generated by the second differential correlation circuit 24b, and outputs the addition result to the timing detector 16.

In this manner, by weighting the three delayed correlation signals, the correlator 60 may change a degree of a fluctuation in a maximum correlation time position due to a delay wave and may generate a correlation signal smaller in fluctuation.

While the present invention has been illustrated and described with respect to several exemplary embodiments thereof, it is to be understood that the invention is by no means limited thereto and encompasses all changes and modifications which will become possible within the scope of the appended claims.

What is claimed is:

1. A correlation calculation unit comprising:
   four arithmetic units each including a first differential arithmetic section calculating a difference between an OFDM signal and a first delay signal delayed from the OFDM signal by a preset time and having a phase changed from the OFDM signal by a preset phase variation, the OFDM signal representing an orthogonal frequency division multiplexing signal, and one symbol interval of the OFDM signal including an effective symbol interval and a guard interval obtained by copying a part of a signal in the effective symbol interval; a second differential arithmetic section calculating a difference between a second delay signal delayed from the OFDM signal by a length of the effective symbol interval and a third delay signal further delayed from the second delay signal by the preset time and having a phase changed from the second delay signal by the preset phase variation; and a multiplication section multiplying an arithmetic result of the first differential arithmetic section by an arithmetic result of the second differential arithmetic section, wherein the four arithmetic units respectively differ in the phase variation by π/2;
   four polarity conversion units provided to correspond to the four arithmetic units, and converting arithmetic results of the multiplication sections of the corresponding arithmetic units into polarity signals indicating polarities of the arithmetic results, respectively;
   four integrating units provided to correspond to the four polarity conversion units, and integrating the polarity signals obtained by the corresponding polarity conversion units, respectively; and
   an addition unit adding up integrated results of the four integrating units, and outputting an addition result as a correlation signal indicating a correlation between the OFDM signal and the second delay signal.

2. A correlation calculation apparatus comprising:
   a plurality of correlation calculation units according to claim 1;
   a control unit controlling delayed OFDM signals that are delayed from the OFDM signal by time lengths that differ among the plurality of correlation calculation units and that are respectively to be input to the plurality of correlation calculation units, as the OFDM signal of each of the plurality of correlation calculation units; and
   a total addition unit adding up correlation signals calculated by and output from the plurality of correlation calculation units, respectively, and outputting an addition result as a correlation signal indicating a correlation between the OFDM signal and a signal delayed from the OFDM signal by the effective symbol interval.

3. The correlation calculation apparatus according to claim 2,
   wherein the control unit further controls signals that are respectively delayed from the delayed OFDM signals for the plurality of correlation calculation units by the effective symbol interval and that are respectively to be input to the plurality of correlation calculation units, as the second delay signal of each of the plurality of correlation calculation units.

4. The correlation calculation apparatus according to claim 2,
   wherein the control unit includes a plurality of delay circuits.

5. The correlation calculation apparatus according to claim 3,
   wherein the control unit includes a plurality of delay circuits.

6. The correlation calculation apparatus according to claim 2,
   wherein the control unit includes
      a storage unit storing the OFDM signal;
      a selective input control unit reading the OFDM signal stored in the storage unit, and selectively inputting the OFDM signal to the plurality of correlation calculation units; and
      an adjustment unit adjusting delay time of the OFDM signal by changing a read region of the storage unit from which the OFDM signal is read.

7. The correlation calculation apparatus according to claim 3,
   wherein the control unit includes
      a storage unit storing the OFDM signal;
      a selective input control unit reading the OFDM signal stored in the storage unit, and selectively inputting the OFDM signal to the plurality of correlation calculation units; and
      an adjustment unit adjusting delay time of the OFDM signal by changing a read region of the storage unit from which the OFDM signal is read.

8. The correlation calculation apparatus according to claim 2, further comprising a weighting unit multiplying a plurality of correlation signals output from the plurality of correlation calculation units by weighting factors preset for the plurality of correlation calculation units, respectively,
   wherein the total addition unit adds up the respective correlation signals multiplied by the weighting factors, and outputs the addition result as the correlation signal indicating the correlation between the OFDM signal and the signal delayed from the OFDM signal by the effective symbol interval.

9. The correlation calculation apparatus according to claim 3, further comprising a weighting unit multiplying a plurality of correlation signals output from the plurality of correlation calculation units by weighting factors preset for the plurality of correlation calculation units, respectively, wherein the total addition unit adds up the respective correlation signals multiplied by the weighting factors, and outputs the addition result as the correlation signal indicating the correlation between the OFDM signal and the signal delayed from the OFDM signal by the effective symbol interval.

10. The correlation calculation apparatus according to claim 4, further comprising a weighting unit multiplying a plurality of correlation signals output from the plurality of correlation calculation units by weighting factors preset for the plurality of correlation calculation units, respectively, wherein the total addition unit adds up the respective correlation signals multiplied by the weighting factors, and outputs the addition result as the correlation signal indicating the correlation between the OFDM signal and the signal delayed from the OFDM signal by the effective symbol interval.

11. The correlation calculation apparatus according to claim 6, further comprising a weighting unit multiplying a plurality of correlation signals output from the plurality of correlation calculation units by weighting factors preset for the plurality of correlation calculation units, respectively, wherein the total addition unit adds up the respective correlation signals multiplied by the weighting factors, and outputs the addition result as the correlation signal indicating the correlation between the OFDM signal and the signal delayed from the OFDM signal by the effective symbol interval.

* * * * *